3,184,927
UNIVERSAL HOMOKINETIC JOINT
Andrea Bellomo, Strada Sant'Anna 82, Turin, Italy
Filed Aug. 2, 1963, Ser. No. 299,826
Claims priority, application Italy, Aug. 2, 1962, 15,639/62
6 Claims. (Cl. 64—21)

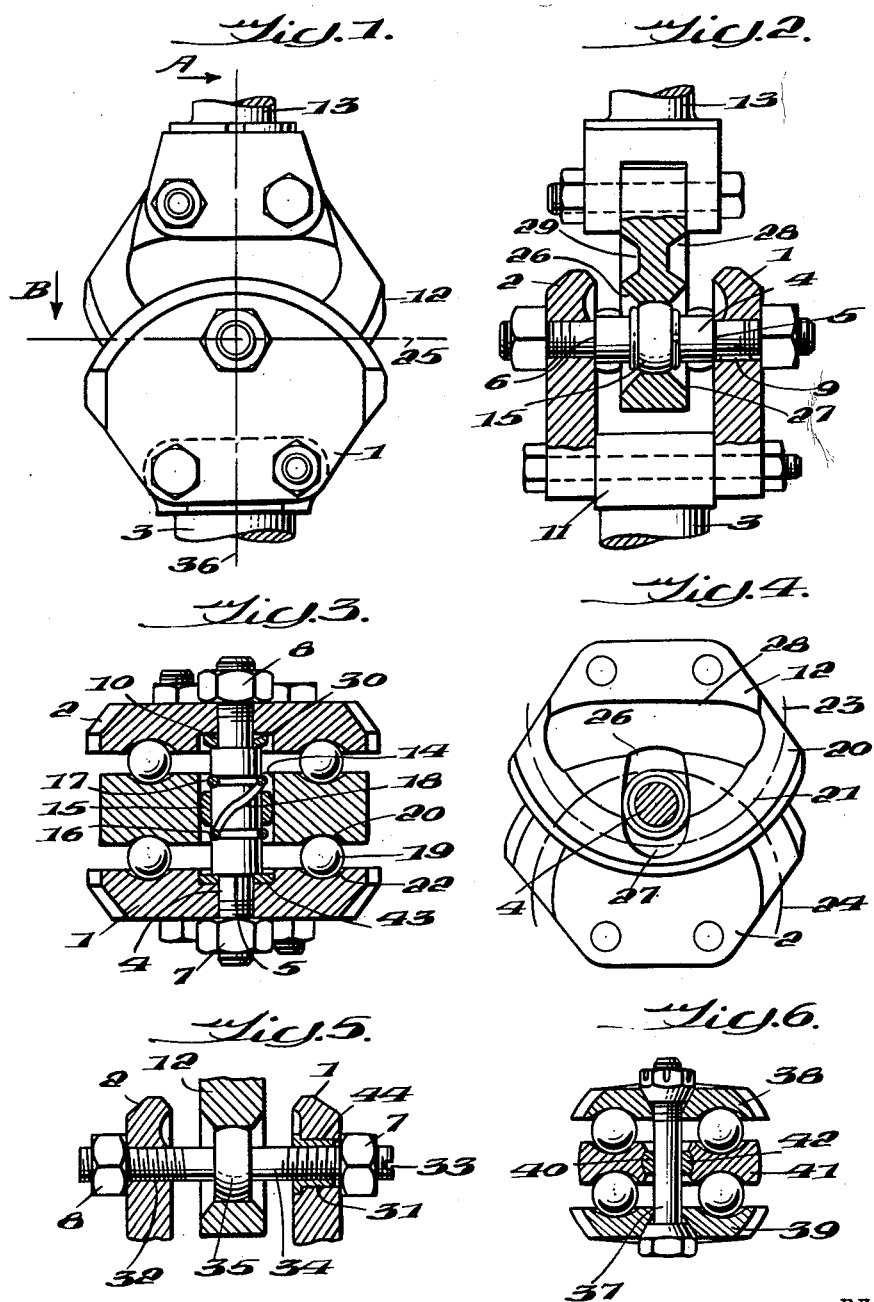

The present invention has for its objects a constant velocity joint for power transmission between angled shafts. It comprises a center plate connected to one shaft and enclosed between two spaced side plates connected to the other shaft. The two side plates are also connected to each other by a spacer cross member bearing a center spherical member housed in a seat in the center plate. The spherical member holds the two shafts connected by the joint in an operative position and acts as the assembly pivotal center. Power transmission is through four balls, each ball being engaged by the crossing of two grooves, one groove being on one side of the center plate, the other groove being on the inner side of one of the side plates. The geometrical axes of the two grooves engaging one ball are symmetrical to the plane passing through the pivotal center and square to the shafts alignment axis. The grooves generally have a circle arc section and a straight or circular geometrical axis. Both center plate and side plates may also be one piece with their shafts.

In general principles, the structure described is known through previous U.S. Patent 2,762,211 whereby it is proposed that a spherical seat in the center plate locate a central spherical member integral with the cross member which provides for side plates spacing and connection. With this structure, however, when the joint is angled with a high torque applied, because of the elastic strain of the different parts, the center plate will tend to move sideways, the direction of movement being determined by the position of the joint and the right or left direction of the torque applied, thus producing a lateral load component between the center spherical member and its seat in the center plate. This load component will not only cause high specific pressures but will alter the natural distribution of forces between the two balls on load, thus causing one ball to be overloaded. To eliminate this trouble, it was also proposed, as shown in FIG. 6, that spherical member 42 be mounted free on the cross member 37 connecting the side plates 38 and 39. In this way, the spherical member 42 will follow the center plate 41 freely when this is inflected. Moreover, if friction forces are neglected, the load resulting between member 42 and its spherical seat 40 is always square to the axis of cross member 37, whereby a convenient load distribution will result between the two balls on load.

As compared to the known technique, the present invention adds further advantages such as the use of a cylindrical seat in place of a spherical seat in the center plate, thus cutting production costs and ensuring improved center pivot lubrification in addition to a rugged and practical connection between side plates.

This invention is described with reference to FIGURES 1 through 6. FIG. 1 shows a side view of a joint according to the present invention. FIG. 2 shows a partial section, as viewed from arrow A, of the joint shown in FIG. 1. FIG. 3 shows a cross-section, as viewed from arrow B, of the joint shown in FIG. 1, including a few alternatives to FIG. 2 as to the method of interconnecting side plates 1 and 2.

FIG. 4 shows a partial side view of the joint shown in FIG. 1 with side plate 1 removed, shafts 3 and 13 with bolts removed, and cross member 4 cut away.

FIG. 5 shows a further alternative to the construction of the cross member connecting the side plates and bearing the center spherical member.

FIG. 6 shows a further constructional modification of the cross member connecting the side plates and carrying the spherical central member.

The two side plates 1 and 2 are connected by bolts to shaft 3 and are spaced from each other by the shaft end 11. These side plates are also interconnected and spaced apart by cross member 4, which is provided with steps 5 and 6 to which the plates are locked by nuts 7 and 8 screwed on at the ends of cross member 4 which is prevented from rotating within plates 1 and 2 by key 9, which is engaged in one of the two plates, or by any other method that may suit.

Center plate 12 is connected by bolts to the other shaft 13 ending with a fork to inclose the center plate.

According to the present invention, a cross hole 14 is made in center plate 12 to locate spherical member 15 which is free to rotate about cross member 14 and is held on both sides by snap rings 16 and 17 housed in grooves in cross member 4. As shown in FIG. 3, snap rings 16 and 17 do not generally contact the sides of spherical member 15, which thus is allowed a small movement in both directions on cross member 4 to follow lateral movement of center plate 12 due to elastic strains on load. The center portion of cross member 4 is generally grooved 18 to aid lubrication of spherical member 15 inner cylindrical surface contacting the cylindrical surface of element 4. Obviously spherical member 15 may also be integral with cross member 4 since its seat in center plate 12 is formed by a cross hole 14 which still allows for relative side movements of center plate 12 and spherical member 15.

Transmission of power is accomplished by four balls as shown in FIG. 3, two balls driving in the right direction and two balls driving in the left direction.

Each ball, e.g. ball 19, is engaged by the crossing 21 of one groove 20 of the center plate 12 and one groove 22 of one side plate, the geometrical axes 23 and 24 of said two grooves being symmetrical to plane 25 which is square to axis 36 of the aligned shafts.

FIGS. 1 and 4 show circular geometrical axis ball grooves, e.g. grooves 23 and 24 in FIG. 4. The same structure, however, allows for the use of straight geometrical axis grooves.

Center plate hole 14 is generally provided with flares 26 and 27, to allow for free conical movement of cross member 4 when the joint is working at great angles. On the sides of center plate 12 are recesses 28 and 29 of suitable shape to allow for free movement of side plates 1 and 2.

FIG. 3 shows, in the top of the drawing, an alternative method of connecting the side plates as compared to that shown in FIG. 2. Step 6 of cross member 4 is not locked directly against plate 2 but through an interposed spring washer 10, which may be conical or of any other suitable shape, housed in a recess 30 on plate 1. By this structure it is possible to adjust the distance between plates 1 and 2 by pressing spring washer 10 through nut 8 in order to provide the correct fit for the assembly. This enables to widen the manufacturing limits determining such fit.

For the same purpose, FIG. 3 shows also a different alternative in the bottom of the drawing. Step 5 is locked by nut 7 against the inner side of side plate 1 with ring 43 interposed. The ring thickness is established at assembly to give the unit the correct fit.

FIG. 5 shows a further alternative method of connecting the side plates. Ends 31 and 32 of cross member 34 are threaded, one left one right, and screwed into their relevant plate as shown in the left side of the drawing for end 32 screwed into plate 2. The distance between plates 1 and 2 can be adjusted by rotating cross member 34 with the aid of a screwdriver inserted in slit 33 or by any other suitable means. The whole assembly is locked by tightening nuts 7 and 8.

Instead of being screwed directly into the side plates, threaded ends 31 and 32 may be screwed into bushings, e.g. 44, each bushing having an edge held by the inner side of its relevant side plate. When bushings are used, such as bushing 44, they may be either slip or press fitted or keyed to the side plates. If the bushings are slip fitted, ends 31 and 32 of cross member 34 may be threaded in the same direction.

FIG. 5 shows also a spherical member 35 integral with cross member 34. This structure, however, requires adjusting also the position of the center spherical member, which must be exactly equi-spaced from side plates 1 and 2.

I claim:

1. A homokinetic universal joint comprising two members, a pair of spaced plates extending from one member, a third plate extending from the other member and projecting between said spaced plates, runways in the opposed faces of said spaced plates and in the faces of said third plate, the axis of each runway in a face of one of the plates of said pair of plates intersecting the axis of a runway in the adjacent face of said third plate, the points of intersection lying symmetrically in the plane which bisects the angle between the axes of said members and which includes the point of intersection of said axes, balls located between each of said pair of plates and the adjacent faces of said third plate, each said ball engaging in two runways at the point of intersection of the axes thereof, and a coupling member positively engaging each of said pair of plates and holding said pair of plates in fixed spaced relationship, said third plate having a cylindrical bore therethrough, said coupling member having carried thereby within said bore a part with a spherical surface engaging the interior wall of the bore around its whole periphery.

2. In a joint as claimed in claim 1, said coupling member comprising a pin having shoulder means thereon facing outwardly towards said spaced plates and engageable thereby to limit movement of the plates toward each other.

3. In a joint as claimed in claim 2, said shoulder means comprising outwardly facing shoulders on the pin and spring washers engaged between said shoulders and said spaced plates.

4. In a joint as claimed in claim 1, said coupling member having ends threaded into said spaced plates with threads of opposite pitch, and locking units threaded on said ends outside the spaced plates.

5. In a joint as claimed in claim 1, said part being turnably mounted on said coupling member, and means for holding said part substantially centrally on the coupling member.

6. In a joint as claimed in claim 5, said holding means permitting slight movement of the part longitudinally of the coupling member.

References Cited by the Examiner
UNITED STATES PATENTS

| | | | |
|---|---|---|---|
| 1,343,728 | 6/20 | Kopf | 64—17 |
| 1,935,926 | 11/33 | Wolf | 64—7 |
| 2,026,244 | 12/35 | Myard | 64—21 |
| 2,149,907 | 3/39 | Briese | 64—21 |
| 2,626,511 | 1/53 | Forsythe | 64—7 |
| 2,762,211 | 9/56 | Bellomo | 64—21 |
| 2,861,438 | 11/58 | Villard | 64—21 |

ROBERT C. RIORDON, *Primary Examiner.*